United States Patent
Jang

(10) Patent No.: US 9,650,069 B2
(45) Date of Patent: May 16, 2017

(54) METHOD FOR CONTROLING REAR WHEEL STEERING

(71) Applicant: MANDO CORPORATION, Pyeongtaek-si (KR)

(72) Inventor: Jae Hoon Jang, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 91 days.

(21) Appl. No.: 14/705,965

(22) Filed: May 6, 2015

(65) Prior Publication Data

US 2015/0321696 A1   Nov. 12, 2015

(30) Foreign Application Priority Data

May 7, 2014   (KR) .................. 10-2014-0054413

(51) Int. Cl.
  *B62D 5/00*   (2006.01)
  *B62D 7/15*   (2006.01)
  *B62D 7/14*   (2006.01)

(52) U.S. Cl.
  CPC ............ *B62D 7/159* (2013.01); *B62D 7/148* (2013.01)

(58) Field of Classification Search
  None
  See application file for complete search history.

(56) References Cited

U.S. PATENT DOCUMENTS

| 8,534,414 | B2 | 9/2013 | Williams | |
|---|---|---|---|---|
| 2004/0243293 | A1* | 12/2004 | Tominaga | B60T 8/172 701/41 |
| 2005/0077696 | A1* | 4/2005 | Ogawa | B60G 17/0162 280/124.157 |
| 2008/0289897 | A1* | 11/2008 | Williams | B62D 5/001 180/402 |
| 2009/0177348 | A1* | 7/2009 | Yanagi | B62D 7/148 701/31.7 |
| 2010/0332083 | A1* | 12/2010 | Yanagi | B60G 7/006 701/42 |
| 2014/0019009 | A1* | 1/2014 | Kogiso | B62D 15/0235 701/42 |
| 2016/0267725 | A1* | 9/2016 | Chundrlik, Jr. | B60W 50/0098 |

FOREIGN PATENT DOCUMENTS

| DE | 689 03 021 | 2/1993 |
|---|---|---|
| DE | 197 20 602 | 1/1998 |
| DE | 11 2004 001 258 | 2/2012 |
| EP | 0 337 360 | 9/1992 |
| JP | 6-98938 | 4/1994 |

OTHER PUBLICATIONS

Office Action dated Jul. 29, 2016 for German Patent Application No. 10 2015 208 304.7 and its English summary provided by Google Translate.

\* cited by examiner

*Primary Examiner* — Truc M Do
*Assistant Examiner* — Jess Whittington
(74) *Attorney, Agent, or Firm* — Ladas & Parry, LLP

(57) ABSTRACT

Provided is a method for controlling rear wheel steering provided for a vehicle. The method includes: recognizing an abnormal condition of a sensor; calculating a speed of a vehicle; calculating a steering angular velocity of the vehicle; calculating torque of a steering column of the vehicle; determining a curvature of a lane along which the vehicle is traveling; and determining a rear wheel steering angle of the vehicle based on the speed of the vehicle, the steering angular velocity, the torque of the steering column, and the curvature of the lane.

8 Claims, 3 Drawing Sheets

METHOD FOR CONTROLING REAR WHEEL STEERING

CROSS-REFERENCE TO RELATED APPLICATION

This application claims the benefit of Korean Patent Application No. 10-2014-0054413, filed on May 7, 2014, the disclosure of which is hereby incorporated herein by reference in its entirety.

BACKGROUND OF THE INVENTION

1. Field of the Invention

The present invention relates generally to a method for controlling rear wheel steering and, more particularly, to a method for controlling rear wheel steering that enables stable steering of a vehicle using a sensor with which the vehicle is equipped when abnormality occurs in a sensor for detecting a stroke of a rear wheel actuator of the vehicle.

2. Description of the Related Art

In the case of vehicles, each of which is equipped with rear wheel steering (RWS) capable of steering rear wheels, the rear wheels are controlled through a separate device. A midpoint of the separate device allowing the rear wheels to be steered needs to be stored at all times.

The reason is that, when there is a problem with a sensor for determining a position of the RWS, an RWS vehicle should return to performance as in an existing two wheel steering (2WS) vehicle in which the rear wheels cannot be steered, by stopping a function of steering the rear wheels and going back to a starting point.

In the case of the conventional RWS vehicles, a method of mounting a plurality of sensors and replacing one of the sensors with another when the one gets out of order or a method of releasing a function of the RWS immediately in such a situation that an sensing error occurs is used.

However, in the former case, there is a problem in that a cost is increased because the plurality of sensors are mounted. In the latter case, when the rear wheels are turned and fixed in this state, a driver may suffer from a heterogeneous sense, which leads to a safety accident.

Therefore, a solution to such problems is required.

SUMMARY OF THE INVENTION

A method for controlling rear wheel steering according to the present invention is intended to allow a vehicle to be stably steered even when abnormality occurs in a sensor for detecting a stroke of a rear wheel actuator of the vehicle without additional devices.

However, the problems to be solved by the present invention are not limited to the aforementioned problems, and other unmentioned problems can be clearly understood by those skilled in the art from the following description.

To address the problem, the present invention provides a method for controlling rear wheel steering provided for a vehicle, which includes: recognizing an abnormal condition of a sensor that detects a stroke of a rear wheel actuator of the vehicle; determining whether the vehicle is traveling straight; and when it is determined that the vehicle is traveling straight, stopping an operation of the rear wheel steering and converting a current mode to a mode of steering the vehicle only with front wheel steering.

Here, the determining of whether the vehicle is traveling straight may include: calculating a speed of the vehicle; calculating a steering angular velocity of the vehicle; calculating torque of a steering column of the vehicle; and determining a curvature of a lane along which the vehicle is traveling. The determining of whether the vehicle is traveling straight may be performed based on the speed of the vehicle, the steering angular velocity, the torque of the steering column, and the curvature of the lane.

Further, the calculating of the speed of the vehicle may include determining whether the speed of the vehicle is equal to or more than a preset first reference value and is less than a preset second reference value.

Further, the calculating of the steering angular velocity may include determining whether the steering angular velocity is less than a preset third reference value.

Further, the calculating of the torque of the steering column may include determining whether the torque of the steering column is less than a preset fourth reference value Further, the determining of the curvature of the lane may include determining whether the curvature of the lane is less than a preset fifth reference value.

Further, determining a rear wheel steering angle of the vehicle may include determining that the rear wheel steering angle of the vehicle is 0° when the speed of the vehicle, the steering angular velocity, the torque of the steering column, and the curvature of the lane satisfy the respective conditions.

In addition, the determining of the curvature of the lane may be performed through a camera provided for the vehicle.

The method for controlling rear wheel steering according to the present invention has an advantage that it can accurately measure a midpoint of the rear wheel steering.

The rear wheel steering angle can be determined using existing devices without mounting separate devices, and thus there is an advantage that no addition cost is required.

Further, a starting point of the rear wheel steering can be checked at any time, so that it can stably cope with an error or failure of a sensor The effects of the present invention are not limited to the aforementioned effects, and other unmentioned effects can be clearly understood by those skilled in the art from the following description.

BRIEF DESCRIPTION OF THE DRAWINGS

The foregoing and other objects, features and advantages of the invention will become more apparent from the following more particular description of exemplary embodiments of the invention and the accompanying drawings. The drawing is not necessarily to scale, emphasis instead being placed upon illustrating the principles of the invention.

DETAILED DESCRIPTION OF THE INVENTION

Hereinafter, a method for controlling rear wheel steering according to the present invention will be described in detail with reference to the drawings.

Figure 1:
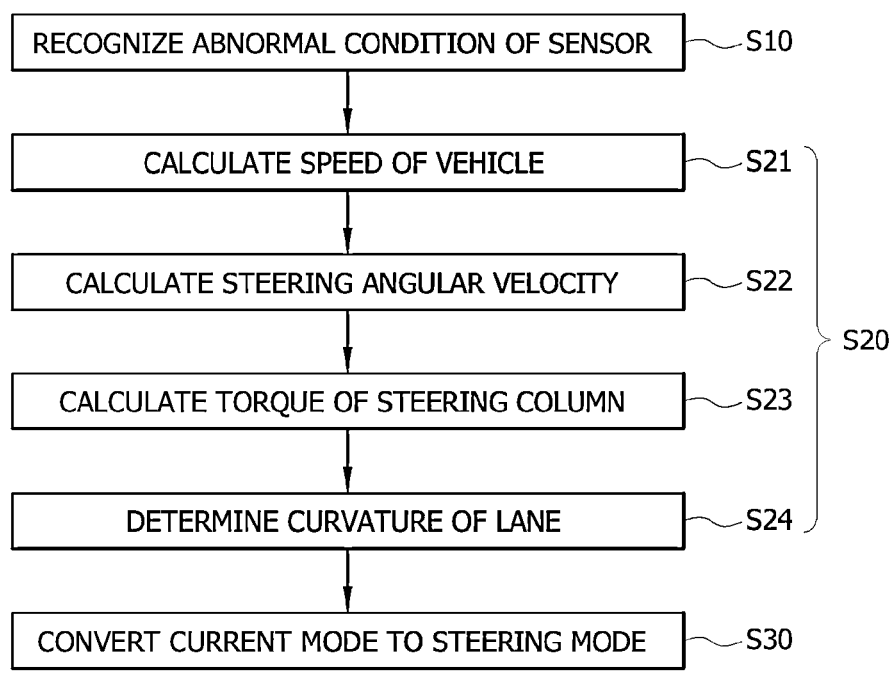
FIG. 1 is a flow chart illustrating each step of a method for controlling rear wheel steering according to an embodiment of the present invention.

FIG. 1 is a flow chart illustrating each step of a method for controlling rear wheel steering according to an embodiment of the present invention.

As illustrated in FIG. 1, a method for controlling rear wheel steering according to an embodiment of the present invention includes the steps of: recognizing an abnormal condition of a sensor that detects a stroke of a rear wheel actuator of a vehicle (S10), determining whether the vehicle is traveling straight (S20), and stopping an operation of the rear wheel steering when the vehicle is traveling straight and converting a current mode to a mode of steering the vehicle only with front wheel steering (S30).

Step S20 of determining whether the vehicle is traveling straight particularly includes the steps of: calculating a speed of the vehicle (S21), calculating a steering angular velocity (S22), calculating torque of a steering column (S23), and determining a curvature of a lane (S24). Whether the vehicle is traveling straight is determined using the speed of the vehicle, the steering angular velocity, the torque of the steering column, and the curvature of the lane.

Hereinafter, each step will be described in detail.

Figure 2:
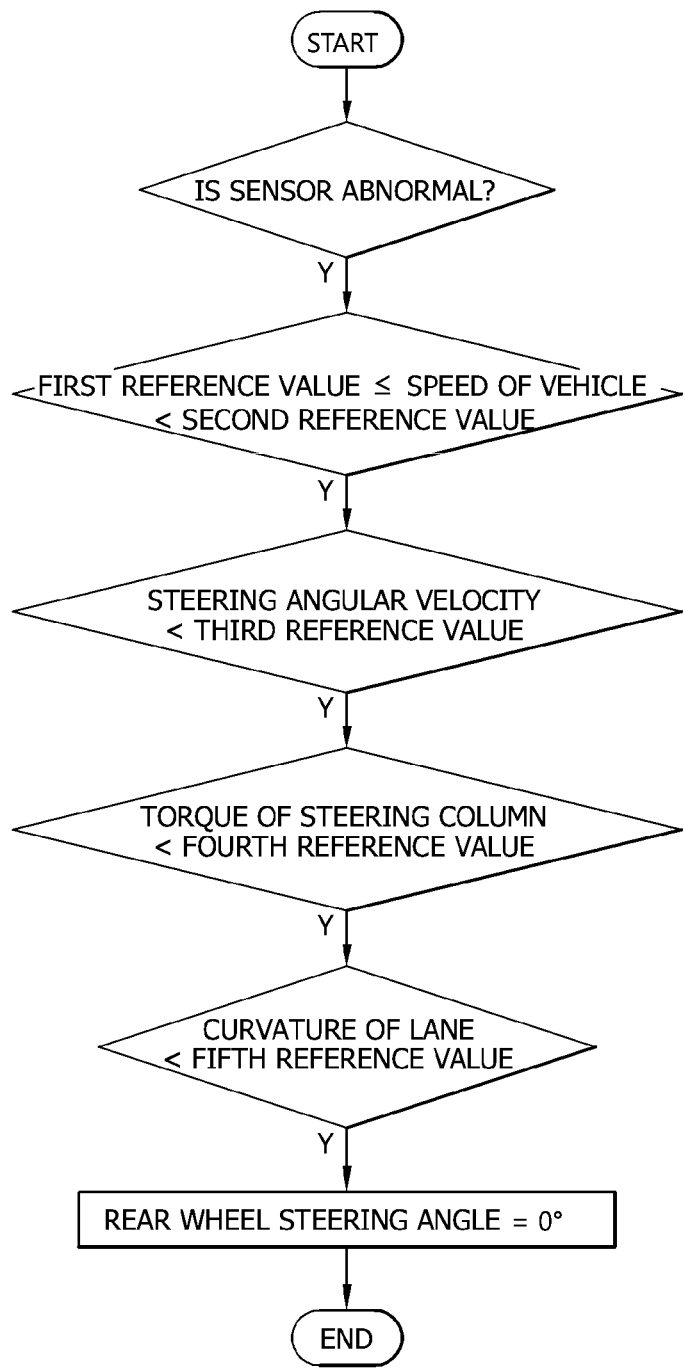
FIG. 2 is a flow chart illustrating an algorithm of the method for controlling rear wheel steering according to the embodiment of the present invention.

FIG. 2 is a flow chart illustrating an algorithm of the method for controlling rear wheel steering according to the embodiment of the present invention.

As illustrated in FIG. 2, first, in step S10 of recognizing the abnormal condition of the sensor, it is determined whether the sensor is in the abnormal condition. If the sensor is in a normal condition, the sensor determines a rear wheel steering angle. When it is determined that the sensor is in the abnormal condition, an operation of the rear wheel steering can be stopped by measuring the rear wheel steering angle and returning the rear wheel steering to a midpoint using the following listed steps.

Here, it is determined whether the vehicle is traveling straight in order to measure the rear wheel steering angle. In this way, factors for determining whether the vehicle is traveling straight may include the speed of the vehicle, the steering angular velocity, the torque of the steering column, and the curvature of the lane.

Thus, in the embodiment of the present invention, when it is determined that the sensor is in the abnormal condition, whether the vehicle is traveling straight is determined by sequentially measuring the speed of the vehicle, the steering angular velocity, the torque of the steering column, and the curvature of the lane.

To the end, after step S10 of recognizing the abnormal condition of the sensor, step S21 of calculating the speed of the vehicle, step S22 of calculating the steering angular velocity, step S23 of calculating the torque of the steering column, and step S24 of determining the curvature of the lane may be performed. Meanwhile, whether the vehicle is traveling straight may be determined by only any one of the speed of the vehicle, the steering angular velocity, the torque of the steering column, and the curvature of the lane. However, whether the vehicle is traveling straight may be more accurately determined by utilizing all pieces of information acquired by various sensors mounted in the vehicle in advance as described above.

On the basis of these, the step of determining whether the vehicle is traveling straight is performed.

To be specific, in step S21 of calculating the speed of the vehicle, it is determined whether the speed of the vehicle is equal to or more than a preset first reference value and is less than a preset second reference value. In step S22 of calculating the steering angular velocity, it is determined whether the steering angular velocity is less than a preset third reference value.

In step S23 of calculating the torque of the steering column, it is determined whether the torque of the steering column is less than a preset fourth reference value. In step S24 of determining the curvature of the lane, it is determined whether the curvature of the lane is less than a preset fifth reference value.

When the conditions as described above are satisfied, it can be determined that the rear wheel steering angle of the vehicle is 0°. That is, it is determined that the vehicle is traveling straight, and then the operation of the rear wheel steering is stopped.

In the present invention as described above, the rear wheel steering angle can be determined only by devices mounted in the vehicle with no need to mount separate devices, and thus there is an advantage in that no addition cost is needed.

Figure 3:
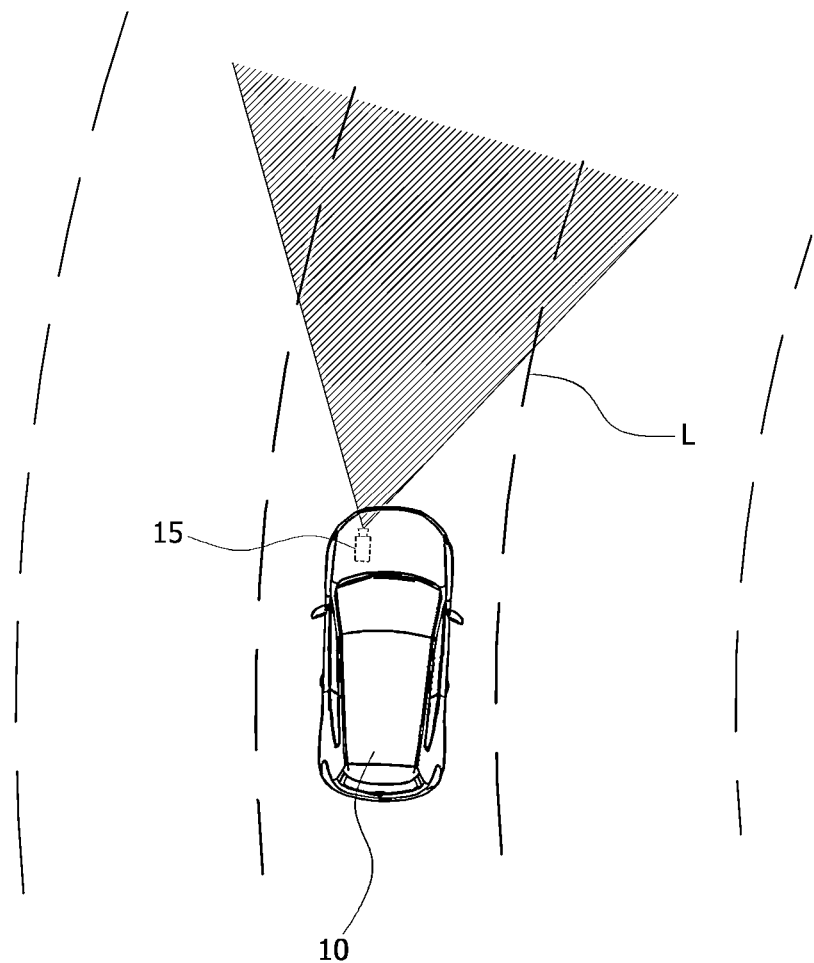
FIG. 3 is a top view illustrating a process of measuring a curvature of a lane using a camera provided for a vehicle in the method for controlling rear wheel steering according to the embodiment of the present invention.

FIG. 3 is a top view illustrating a process of measuring a curvature of a lane L using a camera 15 provided for a vehicle 10 in the method for controlling rear wheel steering according to the embodiment of the present invention.

As illustrated in FIG. 3, step S24 of determining the curvature of the lane may be performed using the camera 15 provided for the vehicle 10. That is, an image of the lane L in front of the vehicle is recorded by the camera 15, and a calculation unit analyzes the image and calculates the curvature of the lane L.

In addition to this determination of the curvature of the lane, the speed of the vehicle, the steering angular velocity, and the torque of the steering column may be used to determine the respective conditions using respective corresponding devices.

The embodiment described in the present specification and the attached drawings are merely illustrative to describe a part of the technical spirit included in the present invention. Accordingly, the embodiment disclosed in the present specification is intended not to limit but to describe the technical spirit of the present invention. Thus, it is apparent that the scope of the technical spirit of the present invention is not limited by this embodiment. It should be interpreted that other modifications and specific embodiments which those with ordinary knowledge in the art can easily infer within the scope of the technical spirit included in the specification and drawings of the present invention also fall within the technical scope of the present invention.

What is claimed is:

1. A method for controlling rear wheel steering provided for a vehicle, the method comprising:
   recognizing an abnormal condition of a sensor that detects a stroke of a rear wheel actuator of the vehicle;
   when the abnormal condition of the sensor is recognized, controlling the rear wheel steering to move rear wheels to a center position and determining whether the vehicle is traveling straight; and
   when it is determined that the vehicle is traveling straight, stopping an operation of the rear wheel steering and converting a current mode to a mode of steering the vehicle only with front wheel steering.

2. The method according to claim 1, wherein the determining of whether the vehicle is traveling straight includes
   calculating a speed of the vehicle,
   calculating a steering angular velocity of the vehicle,
   calculating torque of a steering column of the vehicle, and
   determining a curvature of a lane along which the vehicle is traveling; and
   the determining of whether the vehicle is traveling straight is performed based on the speed of the vehicle, the steering angular velocity, the torque of the steering column, and the curvature of the lane.

3. The method according to claim 2, wherein the calculating of the speed of the vehicle includes determining whether the speed of the vehicle is equal to or more than a preset first reference value and is less than a preset second reference value.

4. The method according to claim 3, wherein the calculating of the steering angular velocity includes determining whether the steering angular velocity is less than a preset third reference value.

5. The method according to claim 4, wherein the calculating of the torque of the steering column includes determining whether the torque of the steering column is less than a preset fourth reference value.

6. The method according to claim 5, wherein the determining of the curvature of the lane includes determining whether the curvature of the lane is less than a preset fifth reference value.

7. The method according to claim 1, wherein in the determining whether the vehicle is traveling straight, it is determined that the vehicle is traveling straight when a speed of the vehicle is between a preset first reference value and a preset second reference value, a steering angular velocity is less than a preset third reference value, a torque of a steering column is less than a preset fourth reference value, and/or a curvature of a lane is less than a preset fifth reference value.

8. The method according to claim 2, wherein the determining of the curvature of the lane is performed through a camera provided for the vehicle.

\* \* \* \* \*